(12) United States Patent
Chandramouli et al.

(10) Patent No.: US 11,863,979 B2
(45) Date of Patent: Jan. 2, 2024

(54) SYSTEMS AND METHODS FOR AUTHENTICATING TIME-SENSITIVE NETWORK ELEMENTS

(71) Applicants: Devaki Chandramouli, Plano, TX (US); Kari Niemela, Oulu (FI); Pilar Andrés Maldonado, Aalborg (DK); Rakash Sivasiva Ganesan, Unterhaching (DE)

(72) Inventors: Devaki Chandramouli, Plano, TX (US); Kari Niemela, Oulu (FI); Pilar Andrés Maldonado, Aalborg (DK); Rakash Sivasiva Ganesan, Unterhaching (DE)

( * ) Notice: Subject to any disclaimer, the term of this patent is extended or adjusted under 35 U.S.C. 154(b) by 224 days.

(21) Appl. No.: 16/992,052

(22) Filed: Aug. 12, 2020

(65) Prior Publication Data
US 2022/0053327 A1 Feb. 17, 2022

(51) Int. Cl.
| *H04L 29/00* | (2006.01) |
| *H04W 12/06* | (2021.01) |
| *H04W 8/02* | (2009.01) |
| *H04W 56/00* | (2009.01) |
| *H04W 12/61* | (2021.01) |
| *H04W 84/04* | (2009.01) |

(52) U.S. Cl.
CPC ............. *H04W 12/06* (2013.01); *H04W 8/02* (2013.01); *H04W 12/61* (2021.01); *H04W 56/001* (2013.01); *H04W 84/042* (2013.01)

(58) Field of Classification Search
CPC ....... H04W 12/06; H04W 12/61; H04W 8/02; H04W 56/001; H04W 84/042
USPC ............................................................ 726/6
See application file for complete search history.

(56) References Cited

U.S. PATENT DOCUMENTS 11,070,627 B2 * 7/2021 Talebi Fard .......... H04L 67/147

OTHER PUBLICATIONS

Ali Zaidi, Anders Branneby, Ala Nazari, Marie Hogan, Christian Kuhlins/ CELLULAR IoT in the 5G ERA/ Feb. 2020/Ericson/ pp. 32-40 (Year: 2020).*

* cited by examiner

*Primary Examiner* — Jeffrey C Pwu
*Assistant Examiner* — Michael D Anderson
(74) *Attorney, Agent, or Firm* — Capitol Patent + Trademark Law Firm, PLLC

(57) ABSTRACT

Device-side, translator functions may be authenticated by elements of a 5G core network before communications involving such functions are allowed to occur, or continue to occur.

18 Claims, 3 Drawing Sheets

SYSTEMS AND METHODS FOR AUTHENTICATING TIME-SENSITIVE NETWORK ELEMENTS

INTRODUCTION

This section introduces aspects that may be helpful to facilitate a better understanding of the described invention(s). Accordingly, the statements in this section are to be read in this light and are not to be understood as admissions about what is, or what is not, in the prior art.

Wireless, fifth generation (5G) telecommunications networks are being presently installed to form core telecommunications networks worldwide. Further, international standards applicable to 5G core networks include the ability to wirelessly connect and support Time-Sensitive Networking (TSN) local networks (e.g., networks that make use of 3GPP standards reference 23.501 5.27). For example, to support TSN networks a 5G core network may function as a communications bridge between two TSN networks. Accordingly, the 5G core network functions as an IEEE 802.1AS compliant entity. Therefore, both the TSN network and 5G core network can be considered as an IEEE 802.1AS "time-aware system".

Time-aware systems and networks need to ensure that all of the devices within the local network and 5G core network are correctly time-synchronized with respect to one another.

Continuing, TSN elements or devices at the edges of the 5G core network may be considered as a part of the 5G core network, and may be configured to complete a TSN translator function that, for example, function to (i) translate 3GPP signals, messages and data into signals, messages and data that can be understood by TSN end stations or vice-versa, by core network devices, which (ii) permits the generation and exchange of signals, messages and data compatible with the generic Precision Time Protocol (gPTP) of the IEEE 802.1AS standard to maintain a common time base (or "clock") needed for professional-quality clocking of audio and video as well as time-sensitive streams such as industrial robotic controls, for example.

Typically there are two types of translator functions, the first one being a network side translator function ("NW-TT") in accordance with the IEEE 802.1AS standard, and the second being a "device side" translator function ("DS-TT") in accordance with the IEEE 802.1AS standard.

To function correctly (e.g., generate and exchange gPTP signals), the DS-TT functions (or processes) need a well-defined "master clock" signal.

Typically, the master clock may be generated by a TSN device in a local network that also functions as a TSN grand master (GM). The so-generated master clock is then distributed to other TSN devices (e.g., end stations) within the local network that the GM is a part of, and, in addition to TSN devices in other local TSN networks that are connected to the same 5G core network. Upon receipt of a master clock signal, each TSN end station (e.g., a robotic machine on an automobile assembly line) in a respective local network uses the master clock signal(s) to complete one or more functions in a correct sequence and/or at a correct time (e.g., assemble an automobile). Further, each TSN end station may generate additional clock signals (referred to as "slave" clock signals or "local" clock signals) which may also be used within a respective local network to complete one or more functions in a correct sequence and/or at a correct time.

Sometimes there are a number of potential master clock signals that may be generated by different TSN devices in a local network. Accordingly, a Best Master Clock Algorithm or Process (BMCA) may be used to select the "best" clock to which all nodes in the TSN network have to synchronize to. All connected time-aware systems participate in the selection of a best master clock so that the IEEE 802.1AS protocol can determine the synchronization spanning tree with the GM as the root.

Because the master clock is selected from among potential master clocks there is concern that an unauthorized, electronic intrusion may occur that maliciously takes control of TSN end devices connected to the 5G System ("5GS", includes a core network and local networks) via a DS-TT function. If this occurs, the now maliciously controlled function within a device may generate a master clock that is selected by the BMCA process to, in effect, maliciously control the time reference of the (g)PTP network. In sum, the intruder could maliciously impact the coordination and communications across a local network (or more).

Accordingly, it is desirable to provide systems, devices and related methods that authenticate DS-TT functions in order to protect wirelessly connected local networks and connected 5G wireless networks from malicious intruders.

SUMMARY

The inventors disclose various systems, devices and related methods that may be used to ensure that a DS-TT in a local network that is wirelessly connected to a 5G core network is authenticated before allowing TSN communications to occur, or continue to occur, between such a DS-TT and other TSN devices within the local or core network.

In accordance with embodiments of the invention described herein an inventive device (UE) within a telecommunications network (e.g., time-aware network) may comprise one or more processors and memory operable to (1) complete user equipment (UE) functions, (2) receive identity & credential values associated with a device-side translator function that is behind the user equipment functions, and (3) transparently, wirelessly forward the received values to one or more devices in a core, wireless time-aware network to authenticate the DS-TT function that is behind the user equipment functions.

Further, the one or more processors and memory may be further operable to transparently, wirelessly forward the values formatted as a Port Management Information container (PMIC).

In addition to initially transparently forwarding DS-T values, the one or more processors and memory of such a device may be further operable to transparently forward authentication responses to one of the one or more devices in the core, wireless network that are completing an Authentication Server function (AUSF) function in order to authenticate the DS-TT function.

Optionally, the one or more processors and memory may be further operable to complete DS-TT functions in addition to UE functions.

In one embodiment the device may comprise time-sensitive end station in a time aware network (e.g., an Internet-of-Things network).

In a second embodiment, one or more inventive devices within a 5G core, wireless network comprising one or more electronic processors and memory may be operable to: (i) complete Access and Mobility Management (AMF) functions, wherein the AMF functions comprise receiving device-side translator function, identity & credential values ("DS-TT values"), and transparently forwarding the received DS-TT values to Network Exposure (NEF) functions, and (ii) complete the NEF functions, wherein the NEF functions comprise reading the DS-TT values and selecting an Authentication Server function (AUSF) based on the read DS-TT values to authenticate a DS-TT function that is behind a user equipment (UE) function associated with the read DS-TT values.

Further, the AMF functions may further comprise receiving the DS-TT values formatted as a Port Management Information container (PMIC), for example.

In a third embodiment, one or more inventive devices within a 5G core, wireless time-aware network comprising one or more electronic processors and memory may be operable to: (i) complete Access and Mobility Management (AMF) functions, wherein the AMF functions comprise receiving device-side translator function, identity & credential values ("DS-TT values"), reading the DS-TT values and selecting an Authentication Server function (AUSF) based on the read DS-TT values to authenticate a DS-TT function that is behind a user equipment (UE) function associated with the read DS-TT values.

Here again, the AMF functions may further comprise receiving the DS-TT values formatted as a Port Management Information container (PMIC).

In addition to the exemplary, inventive devices set forth above, the inventors also provide inventive methods, For example, one inventive method for authenticating a device-side translator function within a telecommunications network may comprise: (a) completing user equipment functions, (b) receiving identity & credential values associated with a device-side translator function that is behind the user equipment functions, and (c) transparently, wirelessly forwarding the received values to one or more devices in a core, wireless network to authenticate the DS-TT function that is behind the user equipment functions.

Such an inventive method may further comprise transparently, wirelessly forwarding the values formatted as a Port Management Information container (PMIC).

In addition to initially transparently forwarding DS-TT values, the method may further comprise transparently forwarding authentication responses to one of the one or more devices in the core, wireless network completing an Authentication Server function (AUSF) function to authenticate the DS-TT function.

Optionally, the method may comprise completing DS-TT functions, and/or completing the functions of a time-aware end station.

In an embodiment the telecommunications network may comprise a time-aware network.

Yet another inventive a method for authenticating a device-side translator function may comprise: (a) completing Access and Mobility Management (AMF) functions, wherein the AMF functions comprise, receiving device-side translator function, identity & credential values ("DS-TT values"), transparently forwarding the received DS-TT values to Network Exposure (NEF) functions; and (b) completing the NEF functions, wherein the NEF functions comprise, reading the DS-TT values, and selecting an Authentication Server function (AUSF) based on the read DS-TT values to authenticate a DS-TT function that is behind a user equipment (UE) function associated with the read DS-TT values.

In such an inventive method the completion of the Access and Mobility Management (AMF) functions may further comprise receiving the DS-TT values formatted as a Port Management Information container (PMIC), for example.

Still another inventive method for authenticating a device-side translator function may comprise completing Access and Mobility Management (AMF) functions, wherein the AMF functions comprise, receiving device-side translator function, identity & credential values ("DS-TT values"), reading the DS-TT values, and selecting an Authentication Server function (AUSF) based on the read DS-TT values to authenticate a DS-TT function that is behind a user equipment (UE) function associated with the read DS-TT values.

Similar to a method above, the completion of the Access and Mobility Management (AMF) functions in this method may also comprise receiving the DS-TT values formatted as a Port Management Information container (PMIC).

DETAILED DESCRIPTION, WITH EXAMPLES

Figure 1:
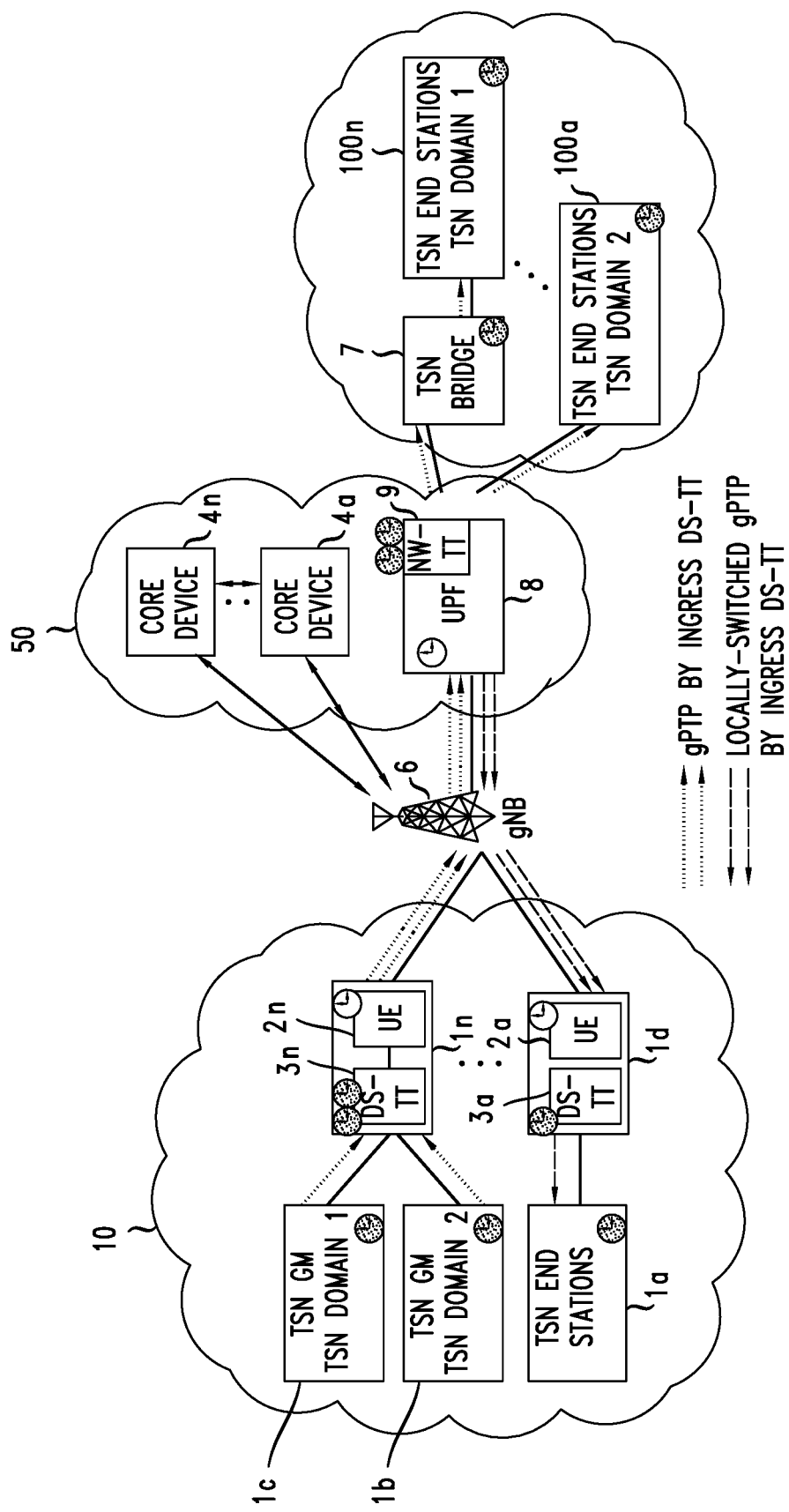
FIG. 1 depicts a simplified block diagram of a 5G wireless core network wirelessly connected to a simplified local network that includes TSN devices according to an exemplary embodiment of the invention.

Exemplary embodiments of systems, devices and related methods for authenticating devices that complete DS-TT functions are described herein and are shown by way of example in the drawings. Throughout the following description and drawings, like reference numbers/characters refer to like elements.

It should be understood that although specific embodiments are discussed herein, the scope of the disclosure is not limited to such embodiments. On the contrary, it should be understood that the embodiments discussed herein are for illustrative purposes, and that modified and alternative embodiments that otherwise fall within the scope of the disclosure are contemplated.

It should also be noted that one or more exemplary embodiments may be described as a process or method (the words "method" or "methodology" may be used interchangeably with the word "process" herein). Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method if, for example, such steps are known by those skilled in the art.

As used herein, the term "and/or" includes any and all combinations of one or more of the associated listed items. As used herein, the singular forms "a," "an" and "the" are intended to include the plural form, unless the context and/or common sense indicates otherwise.

It should be understood that when an system or device, or a component or element of a system or device, is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures for the sake of clarity.

As used herein the term "operable to" means "functions to", and more particularly, may mean an electronic processor and associated memory executing stored instructions are operable to complete certain functions unless the context, common sense or knowledge of one skilled in the art indicates otherwise.

It should be understood that the phrase "processor" means an electronic device that is operable to retrieve and execute instructions stored as electronic signals in electronic memory, where a set of such stored instructions may constitute steps in an inventive process or method, or may be executed to complete an inventive function(s), such as completing: Network Side Translator functions/processes, (NW-TT), Device Side Translator functions/processes (DS-TT), Access and Mobility Management (AMF) functions/processes, Authentication Server functions/processes (AUSF), Network Exposure functions/processes (NEF), Unified Data Management (UDM) functions/processes, Unified Data Repository (UDR) functions/processes, "insertion" functions/processes, "forwarding" functions/processes, "exchanging control signal, data and messaging" functions/processes, "selection" functions/processes, "comparing" functions/processes, "challenging" functions/processes and "completion" function/processes to name just a few of the inventive functions/processes that may be completed by executing such stored electronic instructions. Further, it should be understood that each embodiment of a processor described herein is further configured with the necessary hardware and firmware components to enable each to process control signals, data and/or content (collectively "data") much faster than humanly possible and to receive, transmit and exchange control signals and data much faster than humanly possible. Each of the embodiments of the present invention cannot practically be implemented in any amount of time that would be acceptable to one skilled in the art using human beings as substitutes for the systems and devices described herein. For example, the embodiments described herein involve methods that may authenticate a TSN device executing DS-TT functions in milliseconds. Accordingly, the use of humans as substitutes for such methodologies is contrary to the objectives of the invention and does not result in the improvements provided by the invention because, for example, the inventive methodologies process control signals and data many times faster than the human mind (within the time periods demanded by users of embodiments of the present invention and those skilled in the art of the present invention).

As used herein the term "user equipment" or UE" refers to a device that includes, among other things, electronic circuitry (e.g., a modem) that functions as a radio frequency transceiver to wirelessly (i) transmit signals, messages and data from one or more devices in a local TSN network to a 5G core network using an air interface ("transmit functions") and (ii) receive signals, messages and data from the 5G core network to the one or more devices in the local TSN network using an air interface ("receive functions") in accordance with 3GPP Technical Specification 21.905.

As used herein the phrase "behind a UE" or "behind UE functions" mean (i) a DS-TT function that is completed after UE receive functions have been completed, or (ii) a DS-TT function that is completed before UE transmit functions have been completed. For example, a DS-TT that is behind a UE may complete its translator functions using signals sent from a UE after the UE's receive functions have been competed or using signals sent from a TSN end station before the UE's transmit functions have been completed.

As used herein the word "transparent", "transparently" or its other tenses means that electronic signals, messages and/or data is not processed as a part of an authentication method though such signals, messages and/or data may be received, detected and/or forwarded on for processing as part of an authentication process.

As used herein, the term "embodiment" or "exemplary" mean an example that falls within the scope of the invention(s).

As used herein the phrase "local network" means a network that is not a part of a 5G core network, but wirelessly connects to the 5G core network (e.g., a manufacturing facility, assembly plant, chemical processing plant) and typically uses protocols that provide deterministic, real-time control over systems, devices and processes (e.g., TSN). The local network may include devices that are connected together wirelessly and/or by wired means, and may include devices that may functionally may be considered as a part of the 5G network even though they are typically co-located with the local network devices.

Referring now to FIG. 1 there is depicted a simplified block diagram of an exemplary local network 10 (e.g., a time-aware network, Internet-of-Things (IoT) network) to name just some of many different types of local networks) that is wirelessly connected to a core network 50 via node 6 (e.g., cellular base station). As depicted the core network 50 may comprise one or more core network devices 5a to 5n (where "n" indicates a last core network device) that are operable to complete one or more core network functions, such as AMF, AUSF, NEF, UDM and UDR functions to name just a few of the core network functions that may be completed by one or more core network devices 5a to 5n.

Also shown are one or more local devices 1a to 1n (where "n" indicates a last local device) some of which may comprise time-aware devices (e.g., TSN end stations, such as robotic machines) and some of which may comprise non-TSN devices. In embodiments of the invention, one or more non-time aware, local devices may comprise a device that is operable to complete UE functions 2a to 2n as well as DS-TT functions 3a to 3n. In embodiments of the invention, the DS-TT functions 3a to 3n are completed behind the UE functions 2a to 2n.

Though both the UE and DS-TT functions are depicted as being completed by a single local device in FIG. 1, it should be understood that this is merely exemplary. In an alternative embodiment the DS-TT function 3a to 3n may be completed by a local device that is separate from the local device completing the UE functions 2a to 2n. Still further, one or more of the local time-aware end stations (e.g., TSN end stations) 1a to 1c may be operable to execute DS-TT and/or UE functions as well. Said another way, it should be understood that the DS-TT 3a to 3n and UE functions 2a to 2n may be separately executed (i.e., completed) by a single local non-time-aware device 1a to 1n, by different non-time aware local devices 1a to 1n, or may be included within one or more local time-aware devices (e.g., end stations) 1a to 1c to name just a few of the many possible embodiments. In sum, the inventive methods are applicable to a number of different local network 10 device arrangements provided that the DS-TT function(s) (e.g., translation functions) are completed behind the UE function(s) (radio or air interface functions).

Before continuing, it should be understood that the number of local devices 1a to 1n (including the local time-aware devices 1a to 1c) depicted in FIG. 1 is merely exemplary. In fact, a typical local network 10 may include many more time-aware and non-time aware devices than are depicted in FIG. 1.

In embodiments of the invention each local device 1a to 1n that is operable to complete DS-TT functions is further operable to store its identity (e.g., media access control or "MAC" address), credentials and keys (e.g., codes or coded responses). Thereafter, such a device 1a to 1n is further operable to insert its identity and credentials within a control signal, such as a control signal formatted as a Port Management Information Container (PMIC) within a Packet Data Unit (PDU) Session that the device 1a to 1n may create, for example. More particularly, one or more electronic processors (not shown) within such a device 1a to 1n may be operable to execute instructions stored in one or more memories to insert stored values representing the identity (e.g., MAC address) and credentials of a respective DS-TT 3a to 3n within a PMIC container. In an embodiment, the PMIC container and the so inserted DS-TT identity and credentials along with the identity and credentials of a UE 2a to 2n may be transparently, wirelessly transmitted to one or more core devices 5a to 5n by a device 1a to 1n that completes UE functions (e.g., an electronic processor (not shown) operable to execute instructions stored in one or more memories to complete UE functions) to authenticate the respective DS-TT function), for example (see step 201 in FIG. 2 and step 301 in FIG. 3), it being understood that the identity and credentials are not transmitted to any local device within network 10 that may be functionally considered a part of core network 50.

In more detail, in one embodiment a device 1a to 1n that is operable to complete UE functions may receive a PMIC that includes the inserted DS-TT identity & credential values but may not process the identity and credentials. Instead, the device 1a to 1n completing the UE functions may be operable to transparently, wirelessly forward (e.g., transmit) these values to one or more devices 5a to 5n in the core network 50 as part of a PDU session, for example.

As indicated above, in addition to storing its identity and credentials, one or more processors and memories within a device 1a to 1n that is completing the DS-TT function may be further operable to store additional values, such as security keys and authentication signals which, in addition to the DS-TT's identity and credentials, will be used to verify that the DS-TT function being completed by a device 1a to 1n is an authorized, authenticated DS-TT function and not a malicious DS-TT function.

On the core network 50 side, one or more of the core network devices 5a to 5n (e.g., their associated processors and memories executing stored instructions) that are operable to complete UDM/UDR functions may be further operable to store the correct DS-TT identifier, credentials, security keys and signaling for each authorized and authentic (i.e., non-malicious) DS-TT function that is contemplated to be included in a local network 10.

Though the above embodiment relies on the establishment of a PDU session during which a DS-TT's identity and credentials may be transmitted to the core network 50, it should be understood that the establishment of a PDU session is optional.

For example, if such a PDU session is not desired or required then: (a) a device 5a to 5n in core network 50 that is operable to complete AMF functions may generate a DS-TT authentication request and send the request to a device 1a to 1n that is operable to complete UE/DS-TT functions, for example, or (b) the authentication of a DS-TT 3a to 3n function may be part of registration request sent from a device 1a to 1n operable to complete UE/DS-TT functions to a device 5a to 5n in core network 50 operable to complete AMF functions.

Additionally, in another embodiment the one or more core devices 4a to 4n operable to complete AMF/NEF functions may be operable to authenticate a DS-TT function based on a request generated by another core network function in the core 50 (e.g. a Session Management Function).

In either case, in response to the authentication or registration request the identity and credentials of a DS-TT 3a to 3n within the PMIC are transmitted from a local device 1a to 1n completing UE functions to the core network 50 using non-access stratum signaling (NAS) messages, for example, where device 5a to 5n in core network 50 that is operable to complete AMF functions may be operable to encapsulate the DS-TT identity and credentials as part of NAS signaling so that PMIC containers can be exchanged in the air interface (e.g., radio frequency interface) between the UE and AMF.

Continuing, in one embodiment the device 5a to 5n in the core network 50 that receives a PMIC that includes the inserted DS-TT identity & credential values may be one that completes AMF functions, for example. Though such a device may receive the PMIC that includes the inserted DS-TT identity & credential values, the device 5a to 5n that is completing the AMF function may or may not process (or "read") the inserted DS-TT identity & credential values.

Figure 2:
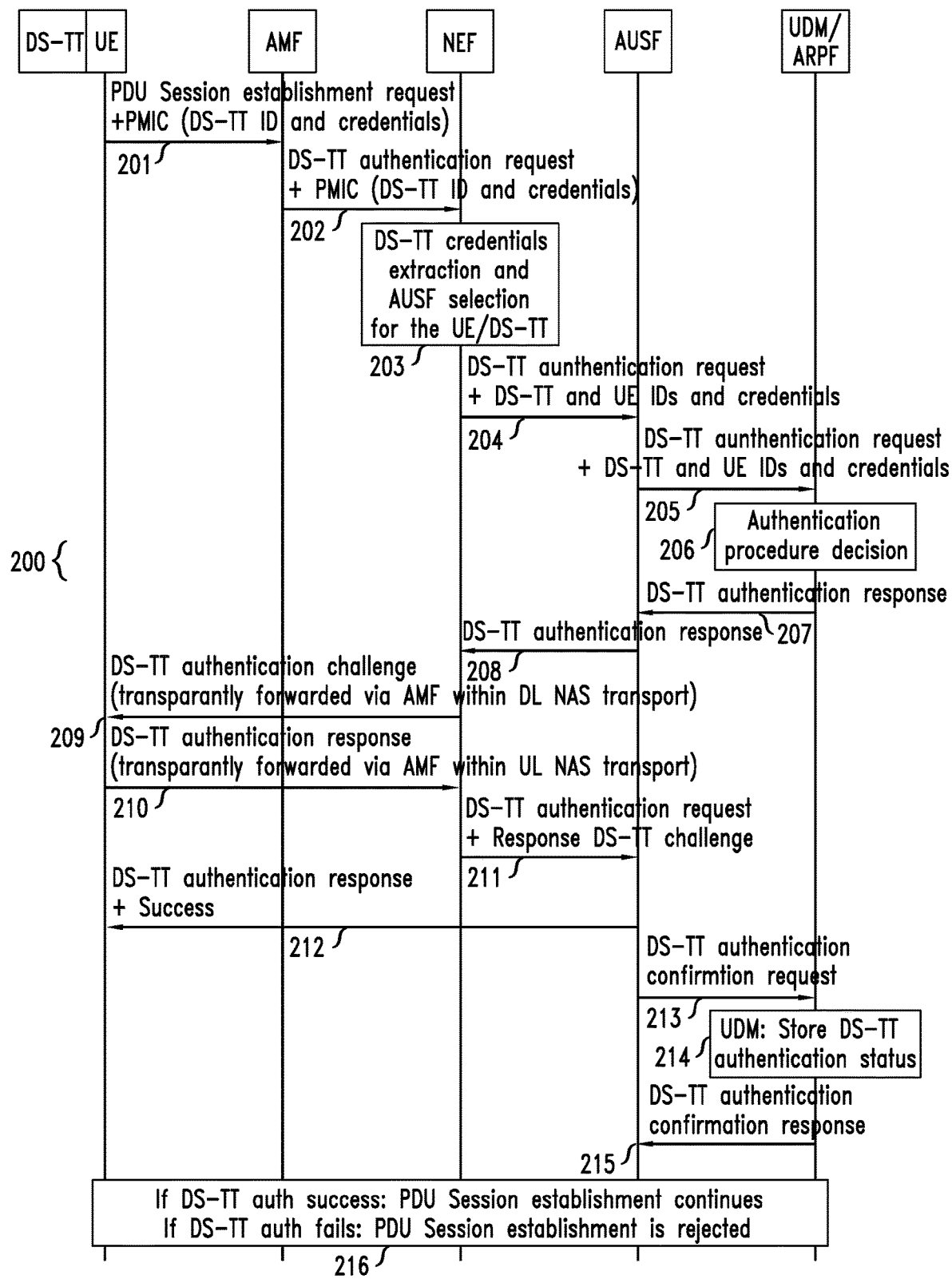
FIG. 2 depicts exemplary exchanges of control signals and associated authentication information used to authenticate a TSN device completing a DS-TT function according to an exemplary embodiment of the invention.

We turn first to the scenario where a device 5a to 5n (e.g., its processors and memories) that completes AMF functions does not read the inserted DS-TT identity & credential values in the PMIC. Instead, such a device transparently forwards the DS-TT identity & credential values in the PMIC to another core network function. Exemplary steps 201 to 216 of such an inventive method 200 that may be completed by one or more core devices 5a to 5n are illustrated in FIG. 2.

Exemplary Method #1

PMIC With DS-TT Identity & Credentials Not Read by Core Network Device that Completes AMF Function In such a scenario the DS-TT identity & credential values may be forwarded to a device 5a to 5n that completes NEF functions (e.g., step 202). It should be noted here, however, that the AMF and NEF functions may be completed by the same device 5a to 5n. In any event, the DS-TT identity and credentials values are not processed by the AMF core network function but, instead, are processed by the NEF core network function.

Upon receiving the DS-TT identity & credential values the device (or devices) 5a to 5n and (e.g., associated processors and memories) operable to complete the NEF function may be further operable to detect, retrieve or read (collectively "read") the PMIC container that includes the DS-TT identity & credential values (e.g., steps 203, 204) and then select an appropriate, stored AUSF function (e.g., 5G Authentication and Key Agreement (AKA), 5G AKA Extensible Authentication Protocol (EAP), or EAP Transport Layer Security (TLS) authentication functions and procedures defined in the 3GPP Technical Specification, Reference 33.501) based on the read values to authenticate the DS-TT function 3a to 3n that is behind the UE function 2a to 2n associated with the received, DS-TT values (e.g., steps 205, 206).

As a part of the authentication process/function, a device 5a to 5n may be operable to compare the received DS-TT identity & credential values to stored, correct values. As a part of this process, a device 5a to 5n (or the same device or device that is completing the AMF, NEF and/or AUSF functions) that is operable to complete UDM/UDR functions may be further operable to provide the stored, correct values for the comparison (e.g. step 206).

In an embodiment, if the stored, correct identity and credentials match the received identity and credential values then one or more devices 5a to 5n that are completing the AUSF, NEF and UDM/UDR functions may be further operable to execute additional steps 207 to 216 to complete the authentication process. Again, it should be noted that the one or more devices 5a to 5n that are completing the AMF function transparently forward control signals, data and messages to the originating local network device 1a to 1n from the one or more devices 5a to 5n that are completing the AUSF, NEF and UDM/UDR functions, and any responsive signals, messages and data from the corresponding DS-TT function may be transparently forwarded from the device 1a to 1n that is completing the UE function. Such steps 207 to 216 may include, for example, sending a "challenge" signal from the device 5a to 5n that is completing the AUSF function to the local network device 1a to 1n that is completing the DS-TT functions behind a UE that originally inserted the DS-TT identity and credentials (collectively such a local network device may be referred to as an "originating, local device") (step 209) which, in turn, requires the originating, local device 1a to 1n to provide a responsive signal (e.g., step 210). The responsive signal (and any included message or data, collectively "response") may then be transparently sent from the device 1a to 1n that is completing the UE function to a core network device 5a to 5n where the responsive signal may be compared to the correct response stored in the device 5a to 5n that is completing the AUSF function for example (e.g. steps 211, 212). If the received response matches the correct, stored response then the device 5a to 5n that is completing the UDM/UDR functions stores the result that, indeed, the DS-TT function in the originating, local device 1a to 1n is confirmed as being authenticated (step 213) and communications from (or to) the originating, local device 1a to 1n may occur or continue to occur (e.g., a potential, master clock generated by the device 1a to 1n may be considered by a BMCA process).

If the received response does not match the correct, stored response then the device 5a to 5n that is completing the UDM/UDR functions stores the result that the DS-TT function in the originating, local device 1a to 1n is not confirmed as being authenticated (step 213) and communications from (or to) the originating, local device 1a to 1n may not occur or continue to occur (e.g., a potential, master clock generated by the device 1a to 1n may not be considered by a BMCA process).

While only some of the steps in FIG. 2 have been discussed above, it should be understood that all of the steps may be necessary to complete an embodiment of the invention.

Exemplary Method #2

Figure 3:
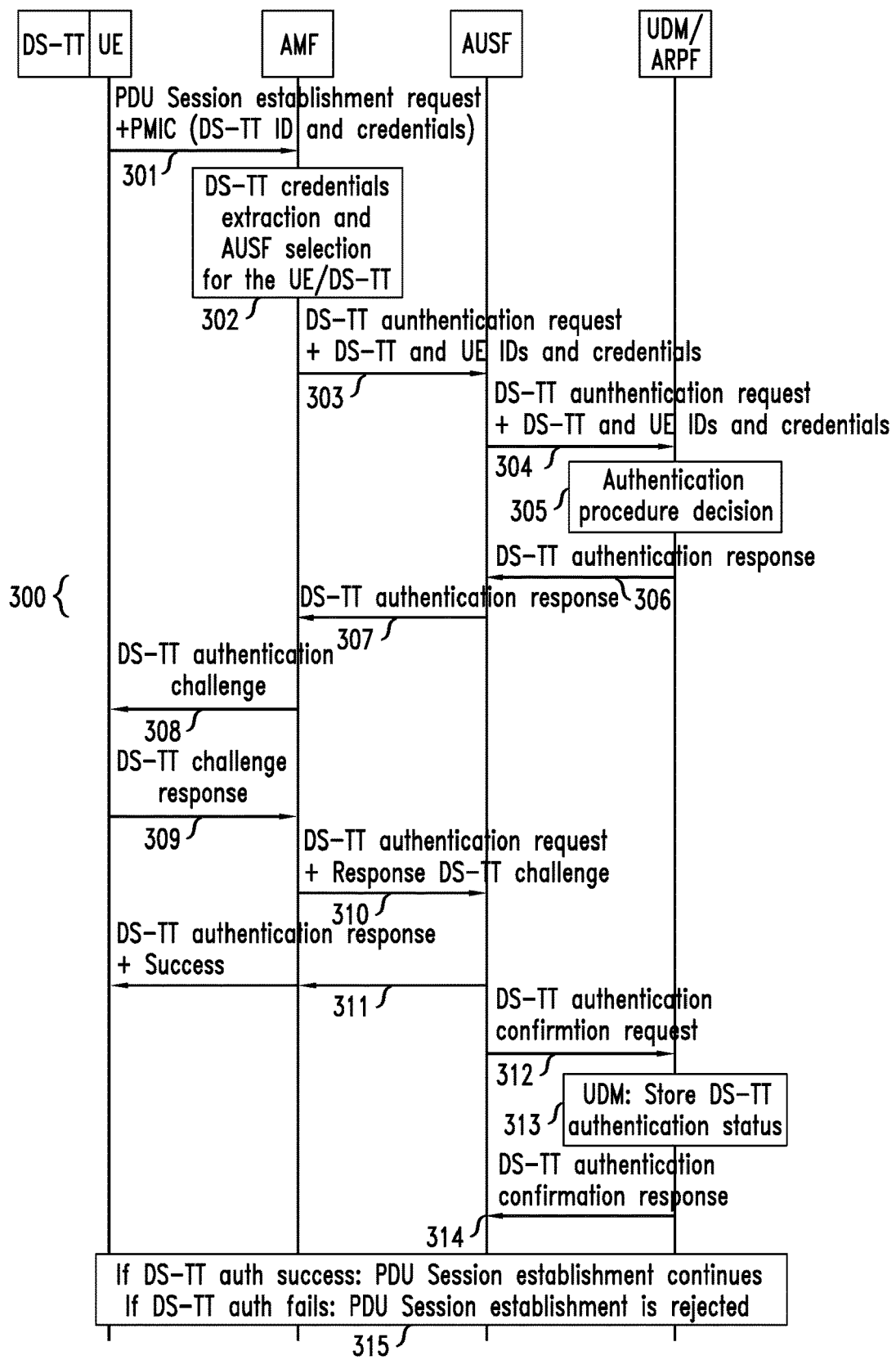
FIG. 3 depicts exemplary exchanges of control signals and associated authentication information used to authenticate a DS-TT function according to a second, exemplary embodiment of the invention.

PMIC With DS-TT Identity & Credentials Read by Core TSN Device that Completes AMF Function We now turn to the second scenario where a core network device (e.g., its processors and memories) 5a to 5n that completes AMF functions reads the inserted DS-TT identity & credential values in the PMIC. Exemplary steps 301 to 315 in such an inventive method 300 that may be completed by one or more core network devices 5a to 5n are illustrated in FIG. 3.

In such a scenario the core NEF function need not be involved in the authentication process. Rather, the core network device (or devices) 5a to 5n and their associated processors and memories operable to complete the AMF function may be further operable to read the PMIC container that includes the DS-TT identity & credential values (e.g., steps 301, 302), for example, and then select an appropriate, stored AUSF function based on the as-read identity and credentials (e.g., 5G AKA, 5G AKA EAP, or EAP TLS authentication functions and procedures defined in the 3GPP Technical Specification, Reference 33.501) based on the read values to authenticate the DS-TT function 3a to 3n that is behind the UE function 2a to 2n associated with the received, DS-TT values (e.g., step 303).

As a part of the authentication process/function, a core network device 5a to 5n may be operable to compare the received DS-TT identity & credential values to be stored, correct values. As a part of this process, a device 5a to 5n (or the same device or device that is completing the AMF and/or AUSF functions) that is operable to complete UDM/UDR functions may be further operable to provide the stored, correct values for the comparison (e.g. steps 304,305).

In an embodiment, if the stored, correct identity and credentials match the received identity and credential values then the device 5a to 5n that is completing the AMF, AUSF and/or UDM/UDR functions may be further operable to execute additional steps 306 to 315 to complete the authentication process. For example, in this embodiment the one or more core network devices 5a to 5n that are completing the AUSF function may send a "challenge" signal to the originating, local device 1a to 1n (step 308) completing the DS-TT functions behind a UE which requires the device 1a to 1n to provide a responsive signal (e.g., steps 309, 310). In an embodiment, the responsive signals may be transparently sent from the device 1a to 1n that is completing the UE function.

The received, responsive signal (and any included message or data, collectively "response") may then be compared to the correct response stored by the core network device 5a to 5n that is completing the AUSF function (e.g. steps 312, 313), for example. If the received response matches the correct, stored response then the device 5a to 5n that is completing the UDM/UDR functions stores the result that, indeed, the DS-TT function in the originating, local device 1a to 1n is confirmed as being authenticated (steps 314, 315) and communications from (or to) the originating, local device 1a to 1n may occur or continue to occur (e.g., a potential, master clock generated by the device 1a to 1n may be considered by a BMCA process).

If, however, the received response does not match the correct, stored response then the device 5a to 5n that is completing the UDM/UDR functions stores the result that the DS-TT function in the originating, local device 1a to 1n is not confirmed as being authenticated (steps 314,315) and communications from (or to) the originating, local device 1a to 1n may not occur or continue to occur (e.g., a potential, master clock generated by the device 1a to 1n may not be considered by a BMCA process).

While only some of the steps in FIG. 3 have been discussed above, it should be understood that all of the steps may be necessary to complete an embodiment of the invention.

It should be understood that the foregoing description only describes a few of the many possible embodiments that fall within the scope of the invention(s). For example, the 5G core network 50 and the functions completed by core network devices 5a to 5n may be operable to function as a TSN networking bridge between two different local networks that include TSN devices/elements.

For example, referring back to FIG. 1 a device 5a to 5n that is operable to complete NW-TT functions may connect the 5G core network 50 with a TSN bridge 7 or end stations 100a to 100n in a second local network 100.

In such a scenario a TSN Application Function (AF) may be completed by one or more of the core network devices 5a to 5n.

Further, the devices 5a to 5n that are completing the TSN AF functions may complete the authentication function(s) or steps set forth in FIG. 2 that are completed by the devices 5a to 5n completing the NEF function, or, alternatively, may complete the authentication function(s) or steps set forth in FIG. 3 that are completed by the devices 5a to 5n completing the AMF function.

Yet further, the authentication methods described herein may be applicable to the authentication of device-side translation functions that are behind a UE in non-TSN networks which require time synchronization. For example, when a non-TSN network requiring time synchronization is wirelessly connected to a 5G core network that makes use of PTP protocols (IEEE 1588-2008 standard). Still further, some of the steps of the inventive methods may be applicable to authenticate device-side translation functions that are behind a UE in non-time aware network.

Numerous changes and modifications to the embodiments disclosed herein may be made without departing from the general spirit of the invention, the scope of which is best defined by the claims that follow.

We claim:

1. A local device operable to complete user equipment (UE) receive and transmit functions within a time-aware telecommunications network, the local device comprising:
   at least one processor and at least one memory operable to store instructions that when executed by the processor cause the local device to,
      receive identity & credential values associated with a first device-side translator (DS-TT) function;
      transparently, wirelessly forward the received identity & credential values to one or more devices in a core, wireless network ("core devices") to authenticate the received identity & credential values associated with the first DS-TT function;
      receive a signal from one of the core devices completing an Authentication Server function (AUSF) provided stored, correct identity and credentials of a second DS-TT function comprising a receive function completed after the UE receive function of the local device and a DS-TT transmit function completed before the UE transmit function of the local device match the received identity and credential values of the first DS-TT function; and
      transparently forward authentication responses to the core device completing the AUSF to authenticate the first DS-TT function associated with the received identity & credential values.

2. The local device as in claim 1 wherein the at least one processor and the at least one memory are further operable to store instructions that when executed by the processor cause the local device to transparently, wirelessly forward the identity & credential values formatted as a Port Management Information container (PMIC).

3. The local device as in claim 1 wherein the at least one processor and at least one memory are further operable to store instructions that when executed by the processor, cause the local device to complete the first DS-TT function.

4. The local device as in claim 1 wherein the network comprises a time-aware network.

5. The local device as in claim 4 wherein the local device comprises a time-aware end station.

6. One or more devices within a 5G core, wireless network ("core devices"), at least one of the core devices comprising at least one processor and at least one memory operable to store instructions that when executed by the processor cause the at least one core device to:
   complete Access and Mobility Management (AMF) functions, wherein the AMF functions comprise receiving device-side translator (DS-TT) function, identity & credential values ("DS-TT values") associated with a first DS-TT function, and transparently forwarding the received DS-TT values to Network Exposure (NEF) functions, and
   complete the NEF functions, wherein the NEF functions comprise reading the received DS-TT values and selecting an Authentication Server function (AUSF) based on the read DS-TT values to authenticate the first DS-TT function provided stored, correct identity and credentials of a second DS-TT function comprising a receive function completed after a user equipment (UE) receive function of a local device and a DS-TT transmit function completed before a UE transmit function of the local device match the received identity and credential values of the first DS-TT function.

7. The one or more devices as in claim 6, wherein the AMF functions comprise receiving the identity & credential DS-TT values formatted as a Port Management Information container (PMIC).

8. One or more devices within a 5G core, wireless network ("core devices"), at least one of the core devices comprising at least one processor and at least one memory operable to store instructions that when executed by the processor cause the at least one core device to:
   complete Access and Mobility Management (AMF) functions, wherein the AMF functions comprise receiving device-side translator function, identity & credential values ("DS-TT values") associated with a first DS-TT function, reading the DS-TT values and selecting an Authentication Server function (AUSF) based on the read DS-TT values to authenticate the first DS-TT function provided stored, correct identity and credentials of a second DS-TT function comprising a receive function completed after a user equipment (UE) receive function of a local device and a DS-TT transmit function completed before a UE transmit function of the local device match the received identity and credential values of the first DS-TT function.

9. The one or more devices as in claim 8, wherein the AMF functions comprise receiving the identity & credential DS-TT values formatted as a Port Management Information container (PMIC).

10. A method for authenticating a device-side translator (DS-TT) function within a wireless telecommunications network comprising:
   receiving identity & credential values associated with a first (DS-TT) function;
   transparently, wirelessly forwarding the received identity & credential values to one or more devices in a core, wireless network ("core devices") to authenticate the first DS-TT function;

receiving a signal from one of the core devices completing an Authentication Server function (AUSF) provided stored, correct identity and credentials of a second DS-TT function of a local device comprising a receive function completed after a user equipment (UE) receive function of the local device and a DS-TT transmit function completed before a UE transmit function of the local device match the received identity and credential values of the first DS-TT function; and transparently forwarding authentication responses to the core device completing the AUSF function to authenticate the first DS-TT function associated with the received identity & credential values.

11. The method as in claim 10 further comprising transparently, wirelessly forwarding the identity & credential values formatted as a Port Management Information container (PMIC).

12. The method as in claim 10 further comprising completing the first DS-TT function.

13. The method as in claim 10 wherein the network comprises a time-aware network.

14. The method as in claim 13 further comprising completing functions of a time-ware end station.

15. A method for authenticating a device-side translator (DS-TT) function comprising:
    completing Access and Mobility Management (AMF) functions, wherein the AMF functions comprise,
    receiving DS-TT function, identity 86 credential values ("DS-TT values") associated with a first DS-TT function, and
    transparently forwarding the received DS-TT values to Network Exposure (NEF) functions; and
    completing the NEF functions, wherein the NEF functions comprise,
        reading the received DS-TT values, and
        selecting an Authentication Server function (AUSF) based on the read DS-TT values to authenticate the first DS-TT function provided stored, correct identity and credentials of a second DS-TT function comprising a receive function completed after a user equipment (UE) receive function of a local device and a DS-TT transmit function completed before a UE transmit function of the local device match the received identity and credential values of the first DS-TT function.

16. The method as in claim 15 wherein completing the (AMF) functions further comprises receiving the identity & credential DS-TT values formatted as a Port Management Information container (PMIC).

17. A method for authenticating a device-side translator (DS-TT) function comprising:
    completing Access and Mobility Management (AMF) functions, wherein the AMF functions comprise,
        receiving DS-TT function, identity & credential values ("DS-TT values") associated with a first DS-TT function,
        reading the received DS-TT values, and
        selecting an Authentication Server function (AUSF) based on the read DS-TT values to authenticate the first DS-TT function provided stored, correct identity and credentials of a second DS-TT function comprising a receive function completed after a user equipment (UE) receive function of a local device and a DS-TT transmit function completed before a UE transmit function of the local device match the received identity and credential values of the first DS-TT function.

18. The method as in claim 17 wherein completing the (AMF) functions further comprises receiving the identity & credential DS-TT values formatted as a Port Management Information container (PMIC).

* * * * *